April 7, 1925.
W. H. FULTON
SWIVEL COUPLING
Filed April 13, 1921
1,532,395
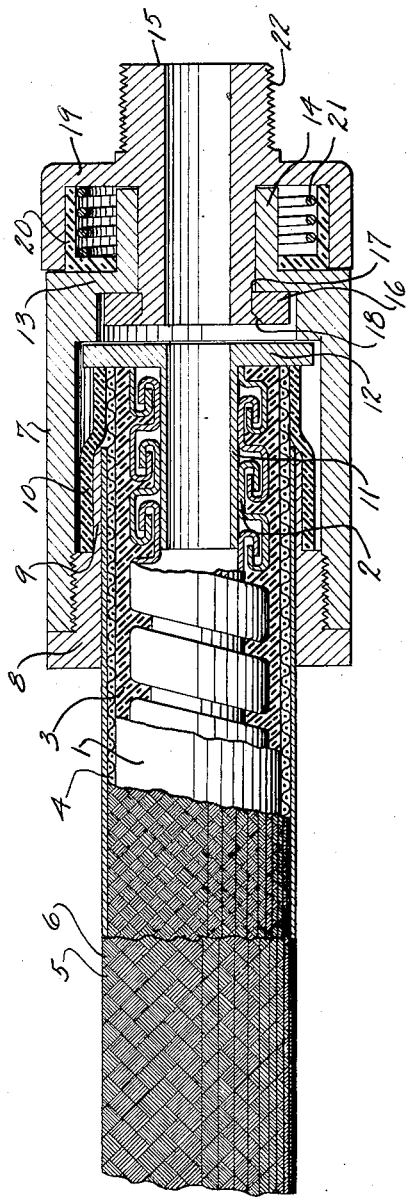

Patented Apr. 7, 1925.

1,532,395

UNITED STATES PATENT OFFICE.

WILLIAM H. FULTON, OF IRVINGTON, NEW JERSEY, ASSIGNOR, BY MESNE ASSIGNMENTS, TO TITEFLEX METAL HOSE CO., A CORPORATION OF NEW JERSEY.

SWIVEL COUPLING.

Application filed April 13, 1921. Serial No. 461,059.

*To all whom it may concern:*

Be it known that I, WILLIAM H. FULTON, a citizen of the United States of America, residing at Irvington, county of Essex, and State of New Jersey, have invented new and useful Improvements in Swivel Couplings, of which the following is a specification.

This invention relates to couplings having a swiveling action.

The invention is especially desirable in connection with the flexible tubes employed for connecting grease guns with the grease openings through which the gearing or bearings of automobiles or other machinery are lubricated, but is useful in a great number of applications.

The main object of the present invention is to provide a coupling which shall swivel easily, be simple in construction, shall be durable and shall be readily assembled.

Other and ancillary objects of the invention will appear hereinafter.

In the accompanying drawings, which illustrate the invention, the figure is a longitudinal central section of a coupling embodying the invention with one end of a flexible hose connected thereto.

Referring to the drawings the tube comprises a flexible interior lining or tube 1 consisting of a helically disposed strip of brass having the edges of adjacent convolutions interfolded as shown at 2, the joints formed by the interfolding having clearances as shown so that the interfolded parts may slide as the tube is flexed. To the outside of the tube 1 is applied a continuous rubber coating 3 which completely envelops the tube 1. This rubber tube is formed by vulcanizing the rubber applied to the tube 1 and secured firmly in position by a spiral textile or braided fabric 4, sufficient pressure being applied to the rubber during vulcanization so as to obtain a dense rubber tube. The rubber will enter the crevices of the interior tube 1 as shown so as to be thoroughly incorporated with it and form a fluid tight covering about it. During the vulcanizing process also, the fabric 4 is pressed into and becomes imbedded in the rubber so that the latter is held in shape and strengthened by it.

To shield the tube as thus far described from twisting strains and also to increase the tensile strength of the structure, there is placed upon the outside of the rubber tube 3 and fabric 4 a metal structure which comprises a helically wound strand 5 which has its ends secured to couplings at the ends of the tube. By winding another strand 6 about the tube in the opposite direction from the strand 5, and securing its ends to the couplings at the ends of the tube, relative turning of the couplings and consequent twisting of the tube structure in the other direction will be prevented. It is generally desirable that there should be a number of strands wound in each direction and interwoven as shown in the drawing.

The couplings at the ends of the tube may be alike and therefore but one is shown and will now be described.

The coupling comprises a cylindrical body portion 7 into one end of which is screwed a hollow plug 8 which surrounds the tube as above described. The armor or outer metal casing comprises the strands 5 and 6 passes within the plug and is sweated or otherwise secured thereto.

The end of the tube extending beyond the inner end of the plug has the outer metal casing or armor removed therefrom so that the vulcanized rubber with the incorporated fabric, as above referred to, is exposed. Surrounding the extension 9 of the plug 8 and also the end of the tube where the rubber is exposed, is a flexible rubber band 10. The resiliency of this band causes it to be tightly pressed against the extension 9 and also against the tube. This band 10, bearing as it does against the end of the tube and the coupling, forms a fluid tight joint.

It will be seen that the fluid which is passing through the tube has access to the exterior of the band 10 and operates to force this band against the end of the tube and against the extension 9 on the plug of the coupling. The greater the fluid pressure, the more tightly will the band be pressed against the tube and coupling, so that the higher the pressure of the fluid conveyed the tighter will be the joint between the tube and the coupling. The fluid tightness of the joint may, therefore, be implicitly relied on.

In order to support and hold the parts in position a ferrule may be applied to the end of the tube, which ferrule comprises a cylindrical part 11 entered within the end of the tube and a flange 12 covering the ends of the tube and sealing band 10. This flange, covering, as it does, the line of division between the sealing band and the tube and being forced against the end of the tube by the pressure in the passage, aids in preventing the fluid from entering between the band and the tube should any such tendency exist. Such entrance would, of course, tend to force the sealing band and the tube apart, or at any rate, neutralize the pressure holding them together so that the tightness of the joint might be impaired.

At its end which is opposite that into which the plug 8 is screwed, the member 7 from withdrawing from the bearing portion 14 for the hollow swiveling member 15. The swiveling member 15 is prevented from withdrawing from the bearing portion 14 by means of a flange 16 secured to the inner end of the member 15. This flange is formed by sliding the ring 16 upon the end of the member 15 so that it comes against a shoulder 17 upon the member 15 and then the end of the member 15 is peened or riveted over into the recess 18 at the inner side of the ring 16. It is preferred that the ring 16 shall be provided with a recess for the peened over portion so that the inner end of the member 15 and the ring 16 will be flush, but the end of the member 15 might extend inwardly beyond the inner face of the ring 16 and peened over when it would extend inwardly beyond the ring. As stated, however, it is usually preferable for the inner end of the member 15 to be flush with the inner face of the ring 16.

At the outer end of the bearing 14 a petticoat 19 extending outwardly from the member 15 is formed integrally therewith and provides a housing for the packing 20 which may be of felt or other suitable material which is pressed against the flange 13 by a spring 21 causing the packing to expand laterally into the joint between the flange 13 and the edge of the petticoat 19. This prevents any of the conveyed material from escaping to the outside of the coupling from the swivel bearing. The spacing of the flange 16 from the petticoat 19 is such that the bearing portion 14 may have an easy running clearance. With such a construction, where the device is used as a grease conveyor, the pressure on the grease may cause it to enter within the bearing 14 and outwardly into the petticoat from which it cannot pass to the exterior of the coupling because of the packing as before referred to. The grease being thus forced into the swivel bearing causes easy operation and contributes to the life of the parts, and at the same time it is not permitted to escape to the exterior of the coupling.

The member 15 may comprise a threaded nipple 22 by which connection may be made to a grease hole or other conduit with which it is desired to establish connection.

While the invention has been described in what is considered its best application it may have other embodiments without departing from its spirit and is not, therefore, limited to the structure shown in the drawing.

What I claim is:

1. In a swivel coupling, the combination with an exterior tubular member of an interior tubular member journaled therein, an abutment on said interior tubular member adapted to bear against the end of said exterior tubular member, an abutment on said interior tubular member bearing against the interior of said exterior tubular member, and a packing adapted to prevent leakage from the outer end of said journal to the exterior of said coupling.

2. In a swivel coupling, the combination of two tubular members, one of said members journaled in the other, an abutment on one of said members adapted to bear against the end of the other member, a second abutment on one of said members adapted to bear against the interior of the other member, a petticoat secured to one of said members, and a packing in said petticoat surrounding said journal.

3. In a swivel coupling, the combination with one hollow member, of a second hollow member journaled in the first mentioned member, an abutment adapted to prevent withdrawal of said second member from the first mentioned member, a petticoat at the outer end of the bearing between said members and a packing within said petticoat, said abutment being separate from but secured to said second member and said petticoat being integral with said second member.

4. The combination with a swivel coupling comprising a sleeve having a plug secured in one end, of a flexible tube secured to said plug, said sleeve having a bearing for a swiveling member at its end opposite said plug and said coupling further comprising a second member journaled in said bearing and having at its inner end a flange separate from but secured to said member and at the outer end of said bearing a petticoat and a packing within said petticoat adapted to prevent leakage from said bearing to the exterior of the coupling.

In testimony whereof I have signed this specification this 5th day of April, 1921.

WILLIAM H. FULTON.